US009083200B2

(12) United States Patent
Tsai et al.

(10) Patent No.: US 9,083,200 B2
(45) Date of Patent: Jul. 14, 2015

(54) UNINTERRUPTIBLE POWER SUPPLY

(75) Inventors: Wen-Yin Tsai, Taoyuan Hsien (TW);
Jen-Chung Liao, Taoyuan Hsien (TW);
Po-Tai Cheng, Hsinchu (TW); Yu-Hsing Chen, Hsinchu (TW)

(73) Assignees: DELTA ELECTRONICS, INC.,
Taoyuan Hsien (TW); NATIONAL TSING HUA UNIVERSITY, Hsinchu (TW)

( * ) Notice: Subject to any disclaimer, the term of this patent is extended or adjusted under 35 U.S.C. 154(b) by 603 days.

(21) Appl. No.: 13/480,846

(22) Filed: May 25, 2012

(65) Prior Publication Data
US 2013/0015704 A1  Jan. 17, 2013

(30) Foreign Application Priority Data

Jul. 13, 2011  (TW) .............................. 100124822 A

(51) Int. Cl.
*H02J 9/00* (2006.01)
*H02J 9/06* (2006.01)
*H02J 9/04* (2006.01)

(52) U.S. Cl.
CPC .. *H02J 9/062* (2013.01); *H02J 9/00* (2013.01);
*H02J 9/04* (2013.01); *H02J 9/06* (2013.01);
*H02J 9/061* (2013.01); *Y10T 307/344* (2015.04)

(58) Field of Classification Search
CPC ................. H02J 9/00; H02J 9/04; H02J 9/06;
H02J 9/061
USPC ........................................ 307/64, 65, 66, 23
See application file for complete search history.

(56) References Cited

U.S. PATENT DOCUMENTS

2006/0220462 A1   10/2006   O'Leary
2007/0152507 A1    7/2007   Lazzarato et al.

FOREIGN PATENT DOCUMENTS

| CN | 201374571 | 12/2009 |
| EP | 0410463 | 10/1994 |
| JP | H05236657 | 9/1993 |
| TW | 201112582 | 4/2011 |

*Primary Examiner* — Hal Kaplan
(74) *Attorney, Agent, or Firm* — Kirton McConkie; Evan R. Witt

(57) ABSTRACT

Disclosed is an uninterruptible power supply, including a rectifier for generating a DC voltage; an energy storage unit; an inverter for converting the DC voltage into a three-phase modulating voltage; a filter; a bypass switch circuit for selectively outputting a three-phase AC voltage or the three-phase modulating voltage as a three-phase load voltage; and a control circuit for controlling the operation of the uninterruptible power supply. The control circuit may use a flux compensation block with different operating modes to adjust the three-phase load voltage at the startup phase of a second inductive load and at the stable phase of the second inductive load, thereby compensating or correcting the flux of the second inductive load to prevent the flux distribution of the second inductive load from being saturated.

20 Claims, 5 Drawing Sheets

US 9,083,200 B2

UNINTERRUPTIBLE POWER SUPPLY

FIELD OF THE INVENTION

The invention relates to an uninterruptible power supply, and more particularly to an uninterruptible power supply capable of suppressing the inrush current.

BACKGROUND OF THE INVENTION

With the rapid advance of information technology and high-tech industries, most of the sophisticated electronic instruments rely on high-quality power supply to maintain normal operations. Uninterruptible power supply serves as a fail-safe power supply that can ensure the reliability of power supply and provide high-quality electricity. Thus far, uninterruptible power supply has become an optimum solution for providing electricity with high-quality and high reliability.

Generally, uninterruptible power supply is mounted between the external power source and the load. When the external power source, such as a commercially available AC power, is able to supply the power required by the load, the uninterruptible power supply can supply power synchronously to the load or convert the commercially available AC power into backup power by an inverter so as to store the backup power in a rechargeable battery. In case that the commercially available AC power is interrupted or abnormal, the uninterruptible power supply can convert the backup power stored in the rechargeable battery into AC power by the inverter and transmit the AC power to the load, thereby ensuring the normal operation of the load.

When the conventional uninterruptible power supply is used to supply power to an inductive load, such as a transformer or an induction motor, the flux of the inductive load will be unbalanced during the positive half-cycles and negative half-cycles as the voltage of the inductive load is agitated. Thus, the phenomenon of flux saturation will occur, which in turn results in inrush current. The inrush current will impair the uninterruptible power supply and trigger the over-current protection mechanism of the uninterruptible power supply. This would cease the operation of the uninterruptible power supply and shut down the load. In this manner, the uninterruptible power supply can not supply power to the inductive load when the commercial available AC power is abnormal or interrupted, and the inductive load can not sustain the operation under such condition.

To date, the solution to address the aforementioned problem is to use an uninterruptible power supply having a rated output capacity being several times of the rated capacity of the inductive load. Or otherwise, a resistance bank can be connected in series with the output end of the uninterruptible power supply. When the inductive load starts operating or when the voltage of the inductive load is agitated, this serially-connected resistance bank can be used to suppress the amplitude of the inrush current.

Nevertheless, these solutions will increase the manufacturing cost of the uninterruptible power supply and aggrandize the volume of the uninterruptible power supply. Moreover, these solutions can only be used to suppress the inrush current for a single load. In case that the uninterruptible power supply is used to supply power to a multiplicity of inductive loads with different capacity and different operating time, these solutions can not effectively address the problems of flux saturation and inrush current.

Hence, the applicants endeavor to develop a voltage and current control methodology for uninterruptible power supply in order to address the aforementioned problems.

SUMMARY OF THE INVENTION

An object of the invention is to provide an uninterruptible power supply for supplying power to a multiplicity of inductive/resistive loads with different capacity and different operating time without inducing inrush currents. The core of the control methodology of the inventive uninterruptible power supply is to control the amplitude and frequency of the three-phase load voltage by the uninterruptible power supply, and thereby suppressing the inrush current induced as a result of power supplying to the load. Hence, the over-current protection mechanism will be triggered to cause faulty operation as a result of the inrush current, thereby preventing the uninterruptible power supply from being shut down. Thus, such control methodology can effectively subdue the impact of the output transient current on the power semiconductor device and maintain the quality of power supply. Compared the inventive uninterruptible power supply to the conventional uninterruptible power supply, the inventive uninterruptible power supply eliminates the consideration of the inrush current and the need of increasing the rated output capacity of the power semiconductor device. Also, the inventive uninterruptible power supply does not need to place a resistance bank at the output end of the uninterruptible power supply. Thus, the inventive uninterruptible power supply is downsized and cheaper.

The invention proposes an uninterruptible power supply for outputting a three-phase load voltage to a first inductive load and a second inductive load. The inventive uninterruptible power supply includes a rectifier for rectifying a three-phase AC voltage into a DC voltage; an energy storage unit connected to the rectifier for storing backup power; an inverter connected to the energy storage unit for converting the DC voltage into a three-phase modulating voltage according to a switching control signal; a filter connected to an output end of the inverter for removing high-frequency components of the three-phase modulating voltage to generate a three-phase inverting voltage; a bypass switch circuit connected to the filter, an input end of the rectifier, the first inductive load, and the second inductive load for selectively outputting the three-phase AC voltage or the three-phase inverting voltage as the three-phase load voltage; and a control circuit for controlling operations of the uninterruptible power supply and transmitting the three-phase inverting voltage to the first inductive load and the second inductive load through the bypass switch circuit by the bypass switch circuit and the inverter when the three-phase AC voltage is abnormal or interrupted. The control circuit is configured to employ a flux compensation block which is set to operate with different operating modes respectively at the startup phase and the stable phase of the second inductive load to adjust the three-phase load voltage for compensating or correcting the flux of the second inductive load, thereby allowing the flux distribution of the second inductive load to be unsaturated and suppressing the inrush current.

Now the foregoing and other features and advantages of the invention will be best understood through the following descriptions with reference to the accompanying drawings, in which:

DESCRIPTION OF THE PREFERRED EMBODIMENT

An exemplary embodiment embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1:
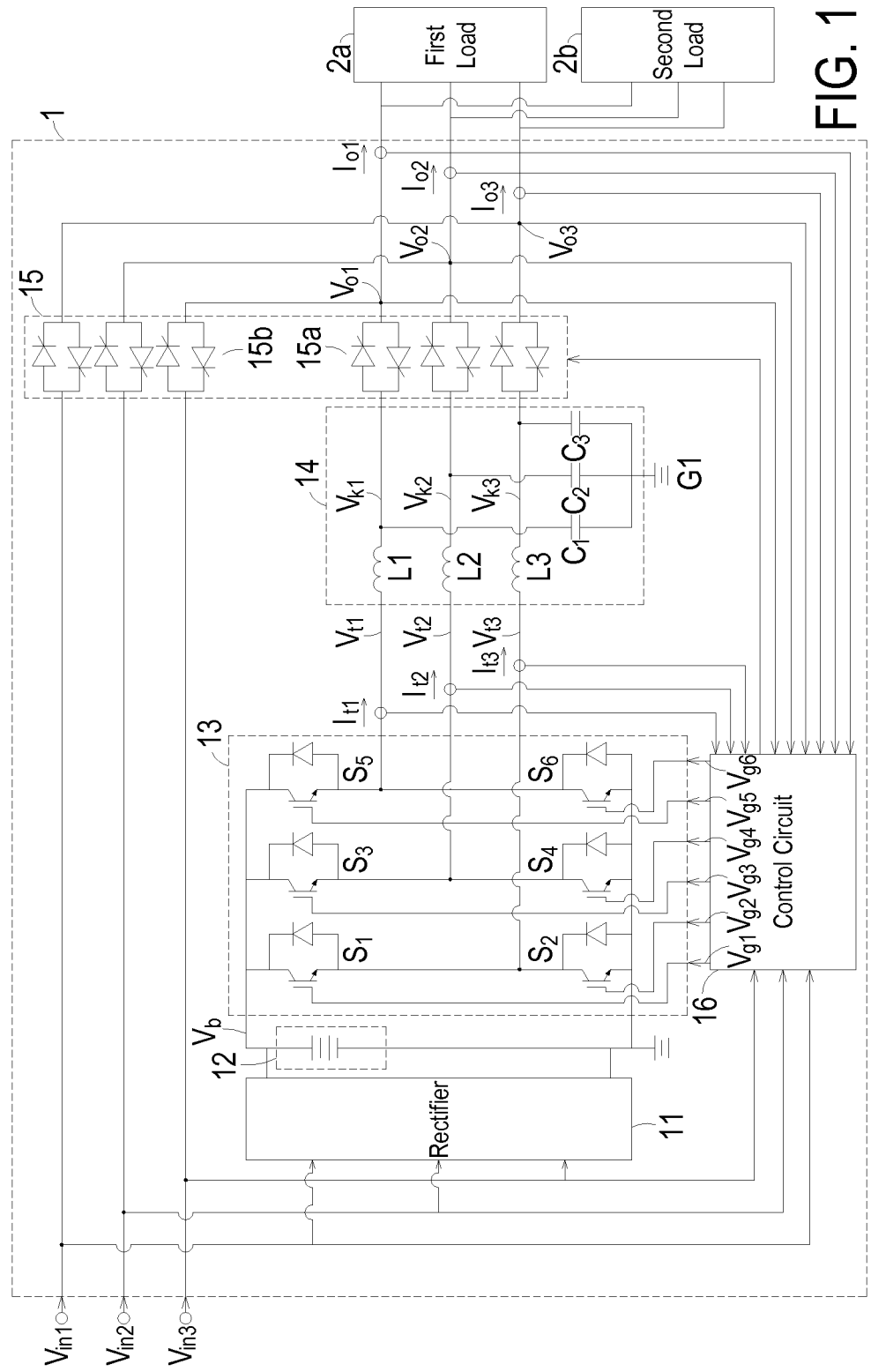
FIG. 1 shows the circuitry of the uninterruptible power supply according to an embodiment of the invention.

Referring to FIG. 1, in which the circuitry of the uninterruptible power supply according to an embodiment of the invention is shown. As shown in FIG. 1, the uninterruptible power supply 1 receives a three-phase AC voltage $V_{in1}$-$V_{in3}$ from a power supply system (not shown) at the input end. The output end of the uninterruptible power supply 1 is connected to a first inductive load 2a and a second inductive load 2b, which may be a three-phase transformer with solid-state circuit breaker. The uninterruptible power supply 1 is used to supply a three-phase load voltage $V_{o1}$-$V_{o3}$ to the first inductive load 2a and the second inductive load 2b. In this embodiment, the uninterruptible power supply 1 includes a rectifier 11, an energy storage unit 12, an inverter 13, a filter 14, a bypass switch circuit (selection circuit) 15, and a control circuit 16. The rectifier 11 is connected to the energy storage unit 12 and the inverter 13 for rectifying the three-phase AC voltage $V_{in1}$-$V_{in3}$ and outputting a DC voltage $V_b$ to the energy storage unit 12 and the inverter 13. The energy storage unit 12 at least includes a battery connected to the rectifier 11 and the inverter 13 for storing backup power.

The input end of the inverter 13 is connected to the energy storage unit 12 and the rectifier 11 and the output end of the inverter 13 is connected to the filter 14. The inverter 13 is used to convert the DC voltage $V_b$ into a three-phase modulating voltage $V_{t1}$-$V_{t3}$ based on pulse-width modulation (PWM). In this embodiment, the inverter 13 may be a voltage source inverter and convert the DC voltage $V_b$ into the three-phase modulating voltage $V_{t1}$-$V_{t3}$ based on the space vector PWM (SVPWM) or the sinusoidal PWM (SPWM).

The input end of the filter 14 is connected to the output end of the inverter 13 and the output end of the filter 14 is connected to the first input end of the bypass switch circuit 15. The filter 14 is used to remove the high-frequency components of the three-phase modulating voltage $V_{t1}$-$V_{t3}$ and outputting a three-phase inverting voltage $V_{k1}$-$V_{k3}$ with a rated voltage and frequency required by the load (such as 380V, 60 HZ) to the first input end of the bypass switch circuit 15. For example, the filter 14 may be used to remove the components of the three-phase modulating voltage $V_{t1}$-$V_{t3}$ having a frequency above the frequency of the three-phase AC voltage $V_{in1}$-$V_{in3}$ of 60 HZ. The first input end of the bypass switch circuit 15 is connected to the output end of the filter 14 and the second input end of the bypass switch circuit 15 is connected to the input end of the rectifier 11. In this embodiment, the output end of the bypass switch circuit 15 is connected to the first inductive load 2a and the second inductive load 2b for selectively outputting the three-phase AC voltage $V_{in1}$-$V_{in3}$ or the three-phase inverting voltage $V_{k1}$-$V_{k3}$ as the three-phase load voltage $V_{o1}$-$V_{o3}$.

The control circuit 16 is connected to the input end of the rectifier 11, the energy storage unit 12, the control end of the inverter 13, the inductors $L_1$-$L_3$ of the filter 14, the control end of the bypass switch circuit 15, and the output end of the bypass switch circuit 15. The control circuit 16 may be a digital signal processor (DSP) for determining if the three-phase AC voltage $V_{in1}$-$V_{in3}$ is abnormal or interrupted. When the three-phase AC voltage $V_{in1}$-$V_{in3}$ is abnormal or interrupted, the backup power stored in the energy storage unit 12 is converted into the three-phase inverting voltage $V_{k1}$-$V_{k3}$ by the inverter 13 and the bypass switch circuit 15, and the three-phase inverting voltage $V_{k1}$-$V_{k3}$ is outputted to the first inductive load 2a and the second inductive load 2b through the first input end and the output end of the bypass switch circuit 15, thereby preventing the serious impact on the three-phase load voltage $V_{o1}$-$V_{o3}$ as a result of the abnormality of interruption of the three-phase AC voltage $V_{in1}$-$V_{in3}$. When the three-phase AC voltage $V_{in1}$-$V_{in3}$ is normal, the uninterruptible power supply 1 may selectively output the three-phase AC voltage $V_{in1}$-$V_{in3}$ or the three-phase inverting voltage $V_{k1}$-$V_{k3}$ as the three-phase load voltage $V_{o1}$-$V_{o3}$ required by the loads 2a and 2b depending on the requirements of the power consumption efficiency.

In this embodiment, the uninterruptible power supply 1 may be an off-line uninterruptible power supply, a line-interactive uninterruptible power supply, or an on-line uninterruptible power supply for supplying power to a multiplicity of loads. Next, the invention will be described in detail by the following example where the uninterruptible power supply 1 is used to supply power to the first inductive load 2a and the second inductive load 2b.

When the inverter 13 is operating, the control circuit 16 can generate switching control signals $V_{g1}$-$V_{g6}$ according to the three-phase inductor current $I_{t1}$-$I_{t3}$ of the inductors $L_1$-$L_3$ in the filter 14, the three-phase load voltage $V_{o1}$-$V_{o3}$ and the three-phase load current $I_{o1}$-$I_{o3}$, so as to drive the inverter 13 to convert the DC voltage $V_b$ into the three-phase modulating voltage $V_{t1}$-$V_{t3}$ based on pulse-width modulation. Also, when the second inductive load 2b is started or when the second inductive load 2b becomes stable after the startup phase, the control circuit 16 uses the flux compensation block (not shown) with different operating mode to regulate the three-phase load voltage $V_{o1}$-$V_{o3}$ to compensate or fix the flux of the second inductive load 2b. Therefore, the control circuit 16 can prevent the flux of the second inductive load 2b from being saturated when the second inductive load 2b is started or when the second inductive load 2b becomes stable after the startup phase, thereby preventing the inrush current from occurring.

In this embodiment, the inverter 13 includes switch elements $S_1$-$S_6$ which are configured to turn on or off in response to the state of the switching control signals $V_{g1}$-$V_{g6}$. The state of the switching control signals $V_{g1}$-$V_{g6}$ may be an enabled state with a high electric potential or a disabled state with a low electric potential. In this manner, the DC voltage $V_b$ can be transmitted to the input end of the filter 14 through the switch elements $S_1$-$S_5$ and/or the sixth switch element $S_6$, thereby outputting the three-phase modulating voltage $V_{t1}$-$V_{t3}$ to the input end of the filter 14. The control terminals of the switch elements $S_1$-$S_6$ are connected to the control circuit 16. The switch elements $S_1$-$S_6$ are paired and each switch element in the pair is connected in series with each other, thereby forming switch pairs. Each switch pair is connected in parallel with each other and connected to the DC side of the rectifier 11 and the energy storage unit 12. In operation, the switch pairs are configured to turn on or off in response to the state of the switching control signals $V_{g1}$-$V_{g6}$, thereby transmitting the DC voltage $V_b$ to the filter 14 through the switch pairs. Also, in this embodiment the inverter 13 further includes six body diodes, each of which is connected in parallel with one of the switch elements $S_1$-$S_6$. The body diodes are used to protect the switch elements $S_1$-$S_6$ when the switch elements $S_1$-$S_6$ are turned off.

In this embodiment, the switch elements $S_1$-$S_6$ may be thyristor switch elements or relays. For example, switch elements $S_1$-$S_6$ may be thyristor switch elements which are made up of bipolar junction transistors (BJTs), metal-oxide-semiconductor field-effect transistors (MOSFETs), insulated gate bipolar transistors (IGBTs), silicon-controlled rectifier (SCRs), or triode AC switch (TRIACs).

In this embodiment, the filter 14 which is made up of high-power passive elements includes inductors $L_1$-$L_3$ and capacitors $C_1$-$C_3$. The inductors $L_1$-$L_3$ are connected between the input end of the inverter 13 and the first input end of the bypass switch circuit 15. The capacitors $C_1$-$C_3$ may be connected to the first input end of the bypass switch circuit 15 and the ground terminal G1 with a Y-configuration.

In this embodiment, the bypass switch circuit 15 includes a first switch circuit 15a and a second switch circuit 15b, both of which are made up of a multiplicity of switch elements, such as silicon-controlled rectifiers. The first switch circuit 15a is connected between the first input end of the bypass switch circuit 15 and the output end of the bypass switch circuit 15. That is, the first switch circuit 15a is connected between the output end of the filter 14 and the output end of the uninterruptible power supply 1. The second switch circuit 15b is connected between the second input end of the bypass switch circuit 15 and the output end of the bypass switch circuit 15. That is, the second switch circuit 15b is connected between the input end of the rectifier 11 and the output end of the uninterruptible power supply 1. The control end of the first switch circuit 15a and the control end of the second switch circuit 15b are connected to the control circuit 16. When the control circuit 16 drives the first second switch circuit 15b to turn on, the three-phase AC voltage $V_{in1}$-$V_{in3}$ will be transmitted to the output end of the uninterruptible power supply 1 through the first second switch circuit 15b. Likewise, when the control circuit 16 drives the first switch circuit 15a to turn on, the three-phase inverting voltage $V_{k1}$-$V_{k3}$ will be transmitted to the output end of the uninterruptible power supply 1 through the first switch circuit 15a.

As the three-phase load voltage $V_{o1}$-$V_{o3}$, the three-phase modulating voltage $V_{t1}$-$V_{t3}$, the three-phase inverting voltage $V_{k1}$-$V_{k3}$, the three-phase AC voltage $V_{in1}$-$V_{in3}$, the three-phase load current $I_{o1}$-$I_{o3}$, and the three-phase inductor current $I_{t1}$-$I_{t3}$ are differentiated with each other by a phase difference of 120 degree, and their voltages or currents are varied periodically (e.g. varied along with a sinusoidal function) depending on the type of the load. Thus, it is difficult to determine if their voltage or current is abnormal in the temporal coordinate system. It is required to reflect or map the three-phase voltage or the three-phase current in the temporal coordinate system to another coordinate system or another domain that is not varied along with the basic function by means of coordinate transformation, so that the reflected or mapped three-phase voltage or the three-phase current can be determined, processed, or controlled further.

In this embodiment, the stationary reference frame transformation, i.e. the Clarke transformation, is performed to carry out three-phase (three-dimensional) transformation and two-phase (two-dimensional)) transformation. Thus, the three-phase voltage ($V_1$-$V_3$) or the three-phase current ($I_1$-$I_3$) in the temporal coordinate system is mapped to the orthogonal α and β coordinate axes in the two-phase stationary reference frame coordinate system. The mapping is carried out by the following equations:

$$\begin{bmatrix} V_\alpha \\ V_\beta \end{bmatrix} = A \begin{bmatrix} V_1 \\ V_2 \\ V_3 \end{bmatrix} = \begin{bmatrix} \frac{2}{3} & -\frac{1}{3} & -\frac{1}{3} \\ 0 & -\frac{1}{\sqrt{3}} & \frac{1}{\sqrt{3}} \end{bmatrix} \begin{bmatrix} V_1 \\ V_2 \\ V_3 \end{bmatrix} \quad (1\text{-}1)$$

$$\begin{bmatrix} I_\alpha \\ I_\beta \end{bmatrix} = A \begin{bmatrix} I_1 \\ I_2 \\ I_3 \end{bmatrix} = \begin{bmatrix} \frac{2}{3} & -\frac{1}{3} & -\frac{1}{3} \\ 0 & -\frac{1}{\sqrt{3}} & \frac{1}{\sqrt{3}} \end{bmatrix} \begin{bmatrix} I_1 \\ I_2 \\ I_3 \end{bmatrix} \quad (1\text{-}2)$$

Afterwards, the synchronous reference frame transformation, i.e. the Park's transformation, is performed to carry out time-variant two-dimensional transformation and time-invariant two-dimensional transformation. Hence, the voltage ($V_\alpha$, $V_\beta$) or the current ($I_\alpha$, $I_\beta$) on the time-variant α and β orthogonal coordinate axes in the two-dimensional stationary reference frame coordinate system (the third coordinate system or the third domain) is mapped to the time-invariant d and q orthogonal coordinate axes in the two-dimensional synchronous reference frame coordinate system (the second coordinate system or the second domain). The mapping is carried out by the following equations:

$$\begin{bmatrix} V_d \\ V_q \end{bmatrix} = B \begin{bmatrix} V_\alpha \\ V_\beta \end{bmatrix} = \begin{bmatrix} \cos\omega t & -\sin\omega t \\ \sin\omega t & \cos\omega t \end{bmatrix} \begin{bmatrix} V_\alpha \\ V_\beta \end{bmatrix} \quad (2\text{-}1)$$

$$\begin{bmatrix} I_d \\ I_q \end{bmatrix} = B \begin{bmatrix} I_\alpha \\ I_\beta \end{bmatrix} = \begin{bmatrix} \cos\omega t & -\sin\omega t \\ \sin\omega t & \cos\omega t \end{bmatrix} \begin{bmatrix} I_\alpha \\ I_\beta \end{bmatrix} \quad (2\text{-}2)$$

Where the angular velocity ω is equal to 2πf, and the frequency signal f whose value is equal to the frequency of the three-phase AC voltage $V_{in1}$-$V_{in3}$ can be calculated by the phase-locked loop (PLL). If the three-phase voltage ($V_1$-$V_3$) or the three-phase current ($I_1$-$I_3$) is in the balanced state, the voltage ($V_d$, $V_q$) or the current ($I_d$, $I_q$) on the d and q orthogonal coordinate axes in the two-dimensional synchronous reference frame coordinate system only contains the DC components. In this embodiment, the time-variant three-dimensional transformation and the time-invariant two-dimensional transformation can be performed directly. That is, the first transformation matrix A (Clarke transformation matrix) and the second transformation matrix B (the Parker's transformation matrix) can be combined, so as to map the time-variant three-phase voltage ($V_1$-$V_3$) or the three-phase current ($I_1$-$I_3$) in the temporal coordinate system directly to the time-invariant d and q orthogonal coordinate axes in the two-dimensional synchronous reference frame coordinate system. The mapping is carried out by the following equations:

$$\begin{bmatrix} V_\alpha \\ V_\beta \end{bmatrix} = BA \begin{bmatrix} V_1 \\ V_2 \\ V_3 \end{bmatrix} = \begin{bmatrix} \cos\omega t & -\sin\omega t \\ \sin\omega t & \cos\omega t \end{bmatrix} \begin{bmatrix} \frac{2}{3} & -\frac{1}{3} & -\frac{1}{3} \\ 0 & -\frac{1}{\sqrt{3}} & \frac{1}{\sqrt{3}} \end{bmatrix} \begin{bmatrix} V_1 \\ V_2 \\ V_3 \end{bmatrix} \quad (3\text{-}1)$$

-continued $$\begin{bmatrix} I_\alpha \\ I_\beta \end{bmatrix} = BA \begin{bmatrix} I_1 \\ I_2 \\ I_3 \end{bmatrix} = \begin{bmatrix} \cos\omega t & -\sin\omega t \\ \sin\omega t & \cos\omega t \end{bmatrix} \begin{bmatrix} \frac{2}{3} & -\frac{1}{3} & -\frac{1}{3} \\ 0 & -\frac{1}{\sqrt{3}} & \frac{1}{\sqrt{3}} \end{bmatrix} \begin{bmatrix} I_1 \\ I_2 \\ I_3 \end{bmatrix} \quad (3\text{-}2)$$

Figure 2:
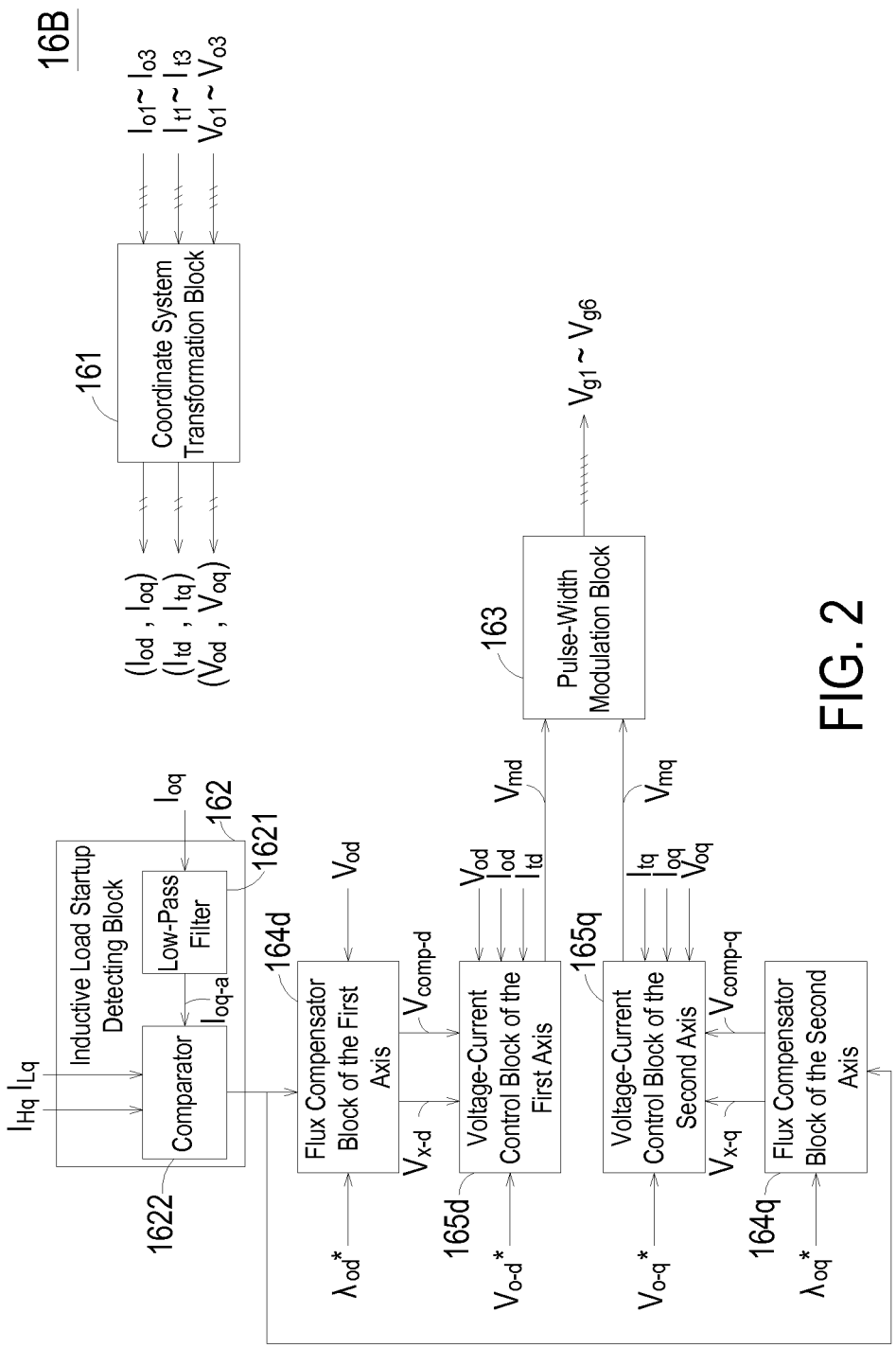
FIG. 2 shows the block diagram of the control block of the control circuit in the uninterruptible power supply according to an embodiment of the invention.

Referring to FIG. 2 and FIG. 1, in which FIG. 2 shows the block diagram of the control block of the control circuit in the uninterruptible power supply according to an embodiment of the invention. As shown in FIG. 2, the control block 16B of the control circuit 16 in the uninterruptible power supply includes a coordinate system transformation block 161, an inductive load startup detecting block 162, a pulse-width modulation block 163, a flux compensator block of the first axis 164d, a flux compensator block of the second axis 164q, a voltage-current control block of the first axis 165d, and a voltage-current control block of the second axis 165q. The coordinate system transformation block 161 is used to perform the time-variant three-dimensional transformation and the time-invariant two-dimensional transformation, so as to map the three-phase inductor current $I_{t1}$-$I_{t3}$, the three-phase load voltage $V_{o1}$-$V_{o3}$, and the three-phase load current $I_{o1}$-$I_{o3}$ to the d and q orthogonal coordinate axes in the two-dimensional synchronous reference frame coordinate system, thereby generating the inductor current ($I_{td}$, $I_{tq}$), the load voltage ($V_{od}$, $V_{oq}$), and the load current ($I_{od}$, $I_{oq}$) in the two-dimensional synchronous reference frame coordinate system.

The inductive load startup detecting block 162 is used to detect if the second inductive load 2b is operating according to the first-axis component $I_{od}$ of the load current ($I_{od}$, $I_{oq}$) and/or the second-axis component $I_{oq}$ of the load current ($I_{od}$, $I_{oq}$). In this embodiment, the inductive load startup detecting block 162 includes a low-pass filter 1621 and a comparator 1622. In operation, the low-pass filter 1621 removes the high-frequency components in the second-axis components of the load current ($I_{od}$, $I_{oq}$) in the two-dimensional synchronous reference frame coordinate system, thereby lowering the risk of causing faulty operations of the inductive load startup detecting block 162 as a result of the noise of electric apparatus. When it is desired to design the low-pass filter 1621, if the switching frequency of the pulse-width modulation is 10 kHz, the cutting frequency fc of the low-pass filter 1621 is set to 5000 Hz that is lower than the switching frequency of the pulse-width modulation. Such design setting is able to remove the current ripple occurred when the power devices (switch elements $S_1$-$S_6$) are switching. The transfer function of the low-pass filter 1621 can be represented by the following equation:

$$\frac{2\pi \cdot f_c}{s + 2\pi \cdot f_c} \quad (4\text{-}1)$$

Next, the comparator 1622 compares the filtered load current with a current upper limit $I_{Hq}$ and/or a current lower limit $I_{Lq}$ and set the operating mode of the flux compensator block 164d of the first axis and the operating mode of the flux compensator block 164q of the second axis in response to the comparison.

In this embodiment, when the second inductive load 2b starts operating and the determining signal $I_{oq\text{-}a}$ of the second axis is higher than the current upper limit $I_{Hq}$ or lower than the current lower limit $I_{Lq}$, the comparator 1622 commands the flux compensator block 164d of the first axis and the flux compensator block 164q of the second axis to change their operating modes from the normal operating mode to the flux correcting (suppressing) mode. In this manner, the flux compensator block 164d of the first axis and the flux compensator block 164q of the second axis respectively stop outputting the first-axis component ($V_{comp\text{-}d}$) and the second-axis component ($V_{comp\text{-}q}$) of a primary compensation voltage command ($V_{comp\text{-}d}$, $V_{comp\text{-}q}$). Instead, the flux compensator block 164d of the first axis and the flux compensator block 164q of the second axis respectively output the first-axis component ($V_{x\text{-}d}$) of a secondary compensation voltage command ($V_{x\text{-}d}$, $V_{x\text{-}q}$) and the second-axis component ($V_{x\text{-}q}$) of the secondary compensation voltage command ($V_{x\text{-}d}$, $V_{x\text{-}q}$). Meanwhile, the voltage-current control block 165d of the first axis is used to generate a first-axis component $V_{md}$ of a reference voltage command ($V_{md}$, $V_{mq}$) according to the first-axis component ($V_{x\text{-}d}$) of the secondary compensation voltage command ($V_{x\text{-}d}$, $V_{x\text{-}q}$) and the first-axis component $V_{o\text{-}d}^*$ of a voltage command ($V_{o\text{-}d}^*$, $V_{o\text{-}q}^*$). Likewise, the voltage-current control block 165q of the second axis is used to generate a second-axis component $V_{mq}$ of the reference voltage command ($V_{md}$, $V_{mq}$) according to the second-axis component ($V_{x\text{-}q}$) of the secondary compensation voltage command ($V_{x\text{-}d}$, $V_{x\text{-}q}$) and the second-axis component $V_{o\text{-}q}^*$ of a voltage command ($V_{o\text{-}d}^*$, $V_{o\text{-}q}^*$).

The flux compensator block 164d of the first axis is used to generate the first-axis component ($V_{x\text{-}d}$) of the secondary compensation voltage command ($V_{x\text{-}d}$, $V_{x\text{-}q}$) according to the first-axis component ($V_{od}$) of the load voltage ($V_{od}$, $V_{oq}$) in the two-dimensional synchronous frame coordinate system and the first-axis component $\lambda_{od}^*$ of a flux command ($\lambda_{od}^*$, $\lambda_{oq}^*$) in the two-dimensional synchronous frame coordinate system. The flux compensator block 164q of the second axis is used to generate the second-axis component $V_{x\text{-}q}$ of the secondary compensation voltage command ($V_{x\text{-}d}$, $V_{x\text{-}q}$) according to the second-axis component $V_{oq}$ of the load voltage ($V_{od}$, $V_{oq}$) in the two-dimensional synchronous frame coordinate system and the first-axis component $\lambda_{oq}^*$ of the flux command ($\lambda_{od}^*$, $\lambda_{oq}^*$) in the two-dimensional synchronous frame coordinate system. Hence, during the flux correction (suppression) phase, the control circuit 16 will adjust the three-phase load voltage $V_{o1}$-$V_{o3}$ to compensate or correct the flux distribution or the flux deviation of the second inductive load 2b in the positive half-cycles and in the negative half-cycles, so as to balance the flux distribution of the second inductive load 2b in the positive half-cycles and in the negative half-cycles (i.e. to make the flux deviation to be substantially zero). Thus, the second inductive load 2b will not be magnetically saturated, and the transient inrush current is avoided.

When the startup of second inductive load 2b is completed and the determining signal $I_{oq\text{-}a}$ of the second axis is lower than the current upper limit $I_{Hq}$ and higher than the current lower limit $I_{Lq}$, the comparator 1622 will command the flux compensator block 164d of the first axis and the flux compensator block 164q of the second axis to change their operating modes from the magnetic correction (suppression) mode to the normal operating mode. Hence, the flux compensator block 164d of the first axis and the flux compensator block 164q of the second axis respectively stop outputting the first-axis component $V_{x\text{-}d}$ and the second-axis component $V_{x\text{-}q}$ of the secondary compensation voltage command ($V_{x\text{-}d}$, $V_{x\text{-}q}$). Instead, the flux compensator block 164d of the first axis and the flux compensator block 164q of the second axis respectively resume outputting the first-axis component ($V_{comp\text{-}d}$) of the primary compensation voltage command ($V_{comp\text{-}d}$, $V_{comp\text{-}q}$) and the second-axis component ($V_{comp\text{-}q}$) of the primary compensation voltage command ($V_{comp\text{-}d}$, $V_{comp-q}$). Meanwhile, the voltage-current control block 165*d* of the first axis is used to generate a first-axis component $V_{md}$ of the reference voltage command ($V_{md}$, $V_{mq}$) according to the first-axis component ($V_{comp-d}$) of the primary compensation voltage command ($V_{comp-d}$, $V_{comp-q}$) and the first-axis component $V_{o-d}^*$ of the voltage command ($V_{o-d}^*$, $V_{o-q}^*$). Likewise, the voltage-current control block 165*q* of the second axis is used to generate a second-axis component $V_{mq}$ of the reference voltage command ($V_{md}$, $V_{mq}$) according to the second-axis component ($V_{comp-q}$) of the primary compensation voltage command ($V_{comp-d}$, $V_{comp-q}$) and the second-axis component $V_{o-q}^*$ of a voltage command ($V_{o-d}^*$, $V_{o-q}^*$).

Overall, the first-axis component $V_{comp-d}$ and the second-axis component $V_{comp-q}$ of the primary compensation voltage command ($V_{comp-d}$, $V_{comp-q}$) which is generated by the flux compensator block 164*d* of the first axis and the flux compensator block 164*q* of the second axis will vary with a primary flux estimator 164*d*1 of the first axis and a primary flux estimator 164*q*1 of the second axis, respectively. However, during the flux correction (suppression) phase, the first-axis component $V_{x-d}$ of the secondary compensation voltage command ($V_{x-d}$, $V_{x-q}$) will vary with the primary flux estimator 164*d*1 of the first axis and a secondary flux estimator 164*d*2 of the first axis, and the second-axis component $V_{x-q}$ of the secondary compensation voltage command ($V_{x-d}$, $V_{x-q}$) will vary with the primary flux estimator 164*q*1 of the second axis and a secondary flux estimator 164*q*2 of the second axis. In other words, the primary compensation voltage command ($V_{comp-d}$, $V_{comp-q}$) generated by the flux compensator block 164*d* of the first axis and the flux compensator block 164*q* of the second axis under the normal operating mode has different characteristics with the secondary compensation voltage command ($V_{x-d}$, $V_{x-q}$) generated under the flux correction (suppression) mode, and the primary compensation voltage command ($V_{comp-d}$, $V_{comp-q}$) and the secondary compensation voltage command ($V_{x-d}$, $V_{x-q}$) can be applied to the second inductive load 2*b* in the transient startup state and applied to the second inductive load 2*b* in the stable state, respectively, In this embodiment, the current upper limit $I_{Hq}$ and the current lower limit $I_{Lq}$ can be calculated by a scaling factor G whose value is about 0-1.0, and the load current ($I_{od}$, $I_{oq}$) in the two-dimensional synchronous reference frame coordinate system under the normal operating mode (where the inrush current is not induced). The current upper limit $I_{Hq}$ and the current lower limit $I_{Lq}$ can be calculated by the following equations:

$$I_{Hd}=I_{od(normal-state)} \times (1+G)$$

$$I_{Ld}=I_{od(normal-state)} \times (1-G) \quad (5\text{-}1)$$

$$I_{Hq}=I_{oq(normal-state)} \times (1+G)$$

$$I_{Lq}=I_{oq(normal-state)} \times (1-G) \quad (5\text{-}2)$$

In this embodiment, the pulse-width modulation block 163 is used to generate the switching control signals $V_{g1}$-$V_{g6}$ according to the first-axis component $V_{md}$ and the second-axis component $V_{mq}$ of the reference voltage command ($V_{md}$, $V_{mq}$) and output the switching control signals $V_{g1}$-$V_{g6}$ to the control end of the inverter 13, so as to drive the inverter 13 to convert the DC voltage $V_b$ into the three-phase modulating voltage $V_{t1}$-$V_{t3}$ based on pulse-width modulation.

Figure 3:
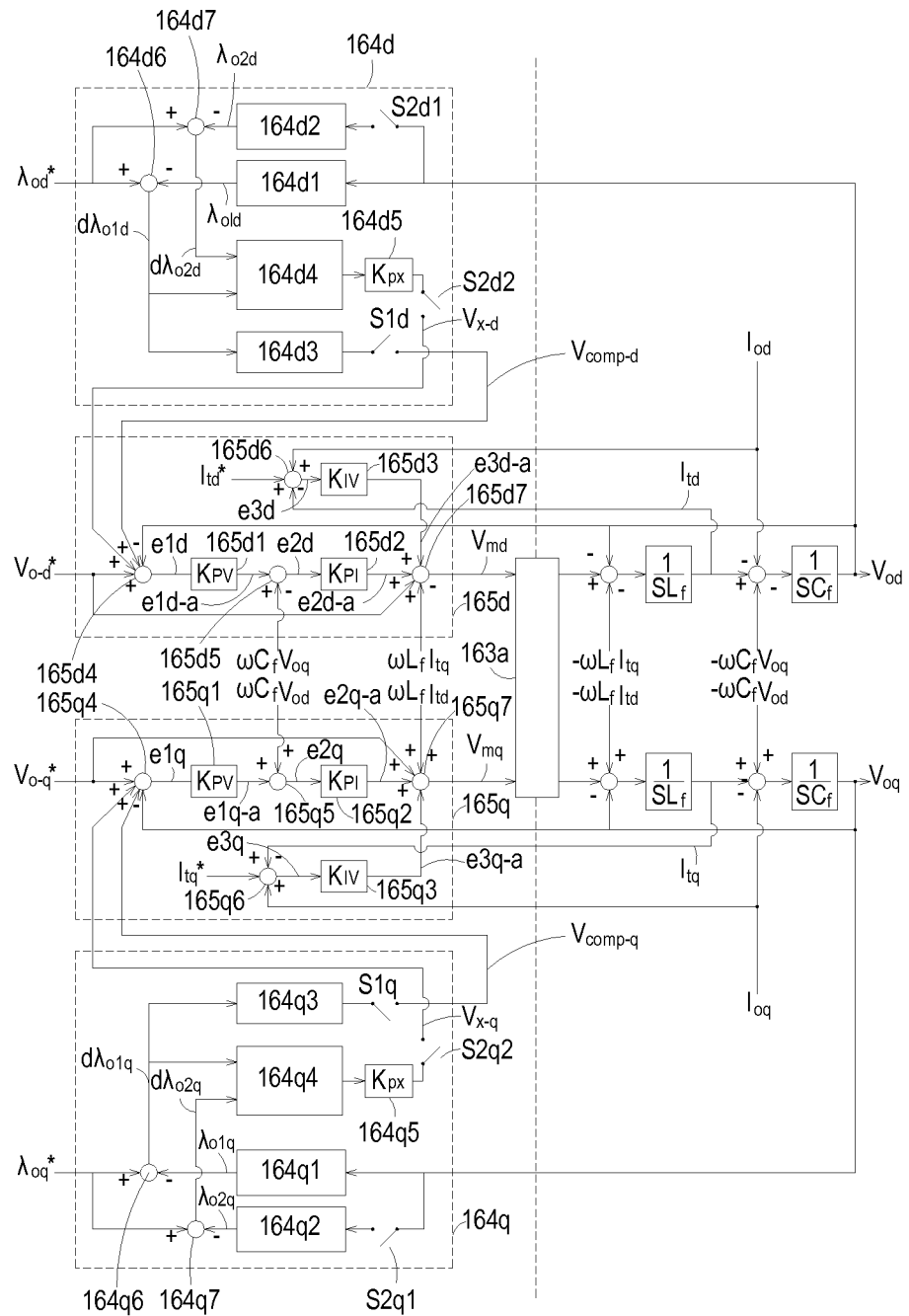
FIG. 3 shows a close-up diagram of the control circuit in the uninterruptible power supply according to an embodiment of the invention.

Referring to FIG. 3 and FIGS. 1 and 2, in which FIG. 3 shows a close-up diagram of the control circuit in the uninterruptible power supply 1 according to an embodiment of the invention. As shown in FIG. 3, the inventive uninterruptible power supply 1 is mapped to the two-dimensional synchronous reference frame coordinate system. The circuitry on the left side of the dotted line which is vertically placed in the middle of the diagram represents the control blocks of the control circuit 16, and the circuitry on the right side of the dotted line which is vertically placed in the middle of the diagram represents the equivalent blocks of the filter 14. In this embodiment, the equivalent capacitance $C_f$ and the equivalent inductance $L_f$ shown in the equivalent blocks of the filter 14 are equivalent to the capacitance of the capacitors $C_1$-$C_3$ and the inductance of the inductors $L_1$-$L_3$, respectively. The gain control and design scheme of the primary flux estimator 164*d*1 of the first axis, the secondary flux estimator 164*d*2 of the first axis, a proportional-integral (PI) and feed-forward control block 164*d*3 of the first axis, and the voltage-current control block 165*d* of the first axis can be made by referring to the article entitled "An inrush current mitigation technique for the line-interactive uninterruptible power supply systems" which is authored by Po-Tai Cheng and Yu-Hsing Chen and published in Proc. IEEE IAS 43rd Annual Meeting, pp. 1-8, 2008.

In this embodiment, the flux compensator block 164*d* of the first axis includes a primary flux estimator 164*d*1 of the first axis, a secondary flux estimator 164*d*2 of the first axis, a proportional-integral (PI) and feed-forward control block 164*d*3 of the first axis, a startup weighing compensation block 164*d*4 of the first axis, a startup proportional compensation block 164*d*5 of the first axis, a first operation block 164*d*6 of the first axis, a second operation block 164*d*7 of the first axis, a flux correction mode primary switch S2*d*1 of the first axis, a flux correction mode secondary switch S2*d*2 of the first axis, and a normal mode switch S1*d* of the first axis.

Under the normal operating mode, the flux correction mode primary switch S2*d*1 of the first axis and the flux correction mode secondary switch S2*d*2 of the first axis are open-circuited, and the normal mode switch S1*d* of the first axis is turned on. The primary flux estimator 164*d*1 of the first axis is used to generate the first-axis component ($\lambda_{o1d}$) of a primary estimated flux ($\lambda_{o1d}$, $\lambda_{o1q}$) according to the first-axis component ($V_{od}$) of the load voltage ($V_{od}$, $V_{oq}$) in the two-dimensional synchronous reference frame coordinate system. The first operation block 164*d*6 of the first axis is used to calculate the first-axis component ($d\lambda_{o1d}$) of a primary flux error ($d\lambda_{o1d}$, $d\lambda_{o1q}$) between the first-axis component ($\lambda_{od}^*$) of the flux command ($\lambda_{od}^*$, $\lambda_{oq}^*$) and the first-axis component ($\lambda_{o1d}$) of the primary estimated flux ($\lambda_{o1d}$, $\lambda_{o1q}$), which means that $d\lambda_{o1d}=\lambda_{od}^*-\lambda_{o1d}$. The proportional-integral (PI) and feed-forward control block 164*d*3 of the first axis is used to generate the first-axis component ($V_{comp-d}$) of the primary compensation voltage command ($V_{comp-d}$, $V_{comp-q}$) according to the first-axis component ($d\lambda_{o1d}$) of the primary flux error ($d\lambda_{o1d}$, $d\lambda_{o1q}$). The first-axis component ($V_{comp-d}$) of the primary compensation voltage command ($V_{comp-d}$, $V_{comp-q}$) is transmitted to the voltage-current control block 165*d* of the first axis through the normal mode switch S1*d* of the first axis. In this embodiment, the proportional-integral (PI) and feed-forward control block 164*d*3 of the first axis includes a first proportional-integral (PI) gain $K_{P\lambda}$ and a second proportional-integral (PI) gain $K_{I\lambda}$, and the transfer function of the proportional-integral (PI) and feed-forward control block 164*d*3 of the first axis can be represented by the following equation:

$$(K_P\lambda+K_I\lambda/s)(\text{The transfer function of feed-forward control}) \quad (6\text{-}1)$$

Under the flux correction mode, the flux correction mode primary switch S2*d*1 of the first axis and the flux correction mode secondary switch S2d2 of the first axis are turned on, and the normal mode switch S1d of the first axis is open-circuited. The primary flux estimator 164d1 of the first axis is used to generate the first-axis component ($\lambda_{o1d}$) of the primary estimated flux ($\lambda_{o1d}$, $\lambda_{o1q}$) according to the first-axis component ($V_{od}$) of the load voltage ($V_{od}$, $V_{oq}$) in the two-dimensional synchronous reference frame coordinate system. The first-axis component ($V_{od}$) of the load voltage ($V_{od}$, $V_{oq}$) in the two-dimensional synchronous reference frame coordinate system is transmitted to the secondary flux estimator 164d2 of the first axis through the flux correction mode primary switch S2d1 of the first axis, and thus the secondary flux estimator 164d2 of the first axis generates the first-axis component ($\lambda_{o2d}$) of the secondary estimated flux ($\lambda_{o2d}$, $\lambda_{o2q}$) according to the first-axis component ($V_{od}$) of the load voltage ($V_{od}$, $V_{oq}$) in the two-dimensional synchronous reference frame coordinate system. The first operation block 164d6 of the first axis is used to calculate the first-axis component ($d\lambda_{o1d}$) of a primary flux error ($d\lambda_{o1d}$, $d\lambda_{o1q}$) between the first-axis component ($\lambda_{od}^*$) of the flux command ($\lambda_{od}^*$, $\lambda_{oq}^*$) and the first-axis component ($\lambda_{o1d}$) of the primary estimated flux ($\lambda_{o1d}$, $\lambda_{o1q}$), which means that $d\lambda_{o1d} = \lambda_{od}^* - \lambda_{o1d}$. The second operation block 164d7 of the first axis is used to calculate the first-axis component ($d\lambda_{o2d}$) of a secondary flux error ($d\lambda_{o2d}$, $d\lambda_{o2q}$) between the first-axis component ($\lambda_{od}^*$) of the flux command ($\lambda_{od}^*$, $\lambda_{oq}^*$) and the first-axis component ($\lambda_{o2d}$) of the secondary estimated flux ($\lambda_{o2d}$, $\lambda_{o2q}$), which means that $d\lambda_{o2d} = \lambda_{od}^* - \lambda_{o2d}$. The startup weighing compensation block 164d4 of the first axis and the startup proportional compensation block 164d5 of the first axis employ a first weighing coefficient $K_{d1}$ and a second weighing coefficient $K_{d2}$ to estimate the average quantity of the flux deviation of the second inductive load 2b in the positive half-cycles and in the negative half-cycles, and then employ a startup proportion $K_{px}$ to transform the estimated average quantity of the flux deviation into the first-axis component $V_{x-d}$ of the secondary compensation voltage command ($V_{x-d}$, $V_{x-q}$), which is in turn transmitted to the corresponding voltage-current control block 165d of the first axis. The relation between the first-axis component ($V_{x-d}$) of the secondary compensation voltage command ($V_{x-d}$, $V_{x-q}$) and the weighing coefficients ($K_{d1}$, $K_{d1}$) as well as the startup proportion $K_{px}$ can be represented by the following equations:

$$V_{x-d} = \frac{K_{d1} \times d\lambda_{o1d} + K_{d2} \times d\lambda_{o2d}}{2} \times K_{px} \quad (7\text{-}1)$$

$$K_{d1} + K_{d2} = 2.0 \quad (7\text{-}2)$$

Where the first weighing coefficient $K_{d1}$ and the second weighing coefficient $K_{d2}$ can be set to a proper value depending on the magnetic saturation threshold of the first inductive load 2a and the magnetic saturation threshold of the second inductive load 2b. For example, if the magnetic saturation threshold of the second inductive load 2b is lower than the magnetic saturation threshold of the first inductive load 2a, the second weighing coefficient $K_{d2}$ can be increased to expedite the compensation or correction of the flux or the flux deviation of the second inductive load 2b. Therefore, the flux compensator block 164d of the first axis and the flux compensator block 164q of the second axis, both of which include the first weighing coefficient $K_{d1}$ and the second weighing coefficient $K_{d2}$, can be used to address the problem of the inrush current for two inductive loads having different magnetic saturation characteristics. The designer can set the first weighing coefficient $K_{d1}$ and the second weighing coefficient $K_{d2}$ appropriately so as to balance the magnetic saturation threshold of the first inductive load 2a and the magnetic saturation threshold of the second inductive load 2b. For example, after the flux correction mode is finished and when the flux or flux deviation of the first inductive load 2a and the second inductive load 2b is corrected and limited to a value within the magnetic saturation threshold, e.g. 1.10-1.15 per unit (p.u.), the flux compensator block 164d of the first axis and the flux compensator block 164q of the second axis can be set to operate under the normal operating mode.

In this embodiment, the voltage-current control block 165d of the first axis includes a first proportional control block 165d1 of the first axis, a second proportional control block 165d2 of the first axis, a third proportional control block 165d3 of the first axis, a third operation block 165d4 of the first axis, a fourth operation block 165d5 of the first axis, a fifth operation block 165d6 of the first axis, and a sixth operation block 165d7 of the first axis. The gain of the first proportional control block 165d1 of the first axis is a first proportion $K_{PV}$. The gain of the second proportional control block 165d2 of the first axis is a second proportion $K_m$. The gain of the third proportional control block 165d3 of the first axis is a third proportion $K_{IV}$.

In operation, the third operation block 165d4 of the first axis is used to generate a first control error $e_{1d}$ of the first axis by adding the first-axis component ($V_{o-d}^*$) of the voltage command ($V_{o-d}^*$, $V_{o-q}^*$) with the first-axis component ($V_{comp-d}$) of the primary compensation voltage command ($V_{comp-d}$, $V_{comp-q}$) plus the first-axis component ($V_{x-d}$) of the secondary compensation voltage command ($V_{x-d}$, $V_{x-q}$) minus the first-axis component ($V_{od}$) of the load voltage ($V_{od}$, $V_{oq}$) in the two-dimensional synchronous frame coordinate system, which means that $e_{1d} = V_{o-d}^* + V_{comp-d} + V_{x-d} - V_{od}$. The first proportional control block 165d1 of the first axis is used to multiply the first control error $e_{1d}$ of the first axis by the first proportion $K_{PV}$ to produce a first adjusting control error $e_{1d-a}$ of the first axis, which is in turn transmitted to the fourth operation block 165d5 of the first axis. The fourth operation block 165d5 of the first axis is used to calculate the difference between the first adjusting control error $e_{1d-a}$ of the first axis and a first decoupling value ($\omega C_f \times V_{od}$) of the first axis, and thereby generating a second control error $e_{2d}$ of the first axis ($e_{2d} = K_{PV} \times e_{1d} - \omega C_f \times V_{od}$). The second proportional control block 165d2 of the first axis is used to multiply the second control error $e_{2d}$ of the first axis by the second proportion $K_{PI}$ to produce a second adjusting control error $e_{2d-a}$ of the first axis ($e_{2d-a} = K_{PI} \times e_{2d}$), which is in turn transmitted to the sixth operation block 165d7 of the first axis. The fifth operation block 165d6 of the first axis is used to add the first-axis component ($I_{td}^*$) of an inductor current command ($I_{td}^*$, $I_{tq}^*$) ($I_{td}^* = \omega C_f \times V_{o-d}^*$) with the first-axis component ($I_{od}$) of the load current ($I_{od}$, $I_{oq}$) in the two-dimensional synchronous frame coordinate system minus the first-axis component ($I_{td}$) of the inductor current ($I_{td}$, $I_{tq}$) in the two-dimensional synchronous frame coordinate system, thereby generating a third control error $e_{3d}$ of the first axis ($e_{3d} = I_{td}^* + I_{od} - I_{td}$). The third proportional control block 165d3 of the first axis is used to multiply the third control error $e_{3d}$ of the first axis by the third proportion $K_{IV}$ to produce a third adjusting control error $e_{3d-a}$ of the first axis ($e_{3d-a} = K_{IV} \times e_{3d}$), which is in turn transmitted to the sixth operation block 165d7 of the first axis. The sixth operation block 165d7 of the first axis is used to calculate the difference among the second adjusting control error $e_{2d-a}$ of the first axis, the third adjusting control error $e_{3d-a}$ of the first axis, a second decoupling value ($\omega C_f \times I_{td}$) of the first axis, and the first-axis component ($V_{o-d}^*$) of the voltage command ($V_{o-d}^*$, $V_{o-q}^*$), thereby generating the first-axis component ($V_{md}$) of the reference voltage command ($V_{md}$, $V_{mq}$), wherein $V_{md}=e_{2d-a}+e_{3d-a}-\omega C_f \times I_{td}+V_{o-d}^*$.

In this embodiment, the control block of the first axis (first-axis) and the control block of the second axis (second-axis) are symmetrical with each other. Thus, the flux compensator block 164q of the second axis includes a primary flux estimator 164q1 of the second axis, a secondary flux estimator 164q2 of the second axis, a proportional-integral (PI) and feed-forward control block 164q3 of the second axis, a startup weighing compensation block 164q4 of the second axis, a startup proportional compensation block 164q5 of the second axis, a first operation block 164q6 of the second axis, a second operation block 164q7 of the second axis, a flux correction mode primary switch S2q1 of the second axis, a flux correction mode secondary switch S2q2 of the second axis, and a normal mode switch S1q of the second axis.

Under the normal operating mode, the flux correction mode primary switch S2q1 of the second axis and the flux correction mode secondary switch S2q2 of the second axis are open-circuited, and the normal mode switch S1q of the second axis is turned on. The primary flux estimator 164q1 of the second axis is used to generate the second-axis component ($\lambda_{o1q}$) of the primary estimated flux ($\lambda_{o1d}$, $\lambda_{o1q}$) according to the second-axis component ($V_{oq}$) of the load voltage ($V_{od}$, $V_{oq}$) in the two-dimensional synchronous reference frame coordinate system. The first operation block 164q6 of the second axis is used to calculate the second-axis component ($d\lambda_{o1q}$) of the primary flux error ($d\lambda_{o1d}$, $d\lambda_{o1q}$) between the second-axis component ($\lambda_{oq}^*$) of the flux command ($\lambda_{od}^*$, $\lambda_{oq}^*$) and the second-axis component ($\lambda_{o1q}$) of the primary estimated flux ($\lambda_{o1d}$, $\lambda_{o1q}$), which means that $d\lambda_{o1q}=\lambda_{oq}^*-\lambda_{o1q}$. The proportional-integral (PI) and feed-forward control block 164q3 of the second axis is used to generate the second-axis component ($V_{comp-q}$) of the primary compensation voltage command ($V_{comp-d}$, $V_{comp-q}$) according to the second-axis component ($d\lambda_{o1q}$) of the primary flux error ($d\lambda_{o1d}$, $d\lambda_{o1q}$). The second-axis component ($V_{comp-q}$) of the primary compensation voltage command ($V_{comp-d}$, $V_{comp-q}$) is transmitted to the voltage-current control block 165q of the second axis through the normal mode switch S1q of the second axis. In this embodiment, the proportional-integral (PI) and feed-forward control block 164q3 of the second axis includes a first proportional-integral (PI) gain $K_{P\lambda}$, and a second proportional-integral (PI) gain $K_{I\lambda}$, and the transfer function of the proportional-integral (PI) and feed-forward control block 164q3 of the second axis can be represented by the foregoing equation (6-1):

$(K_P\lambda + K_I\lambda/s)$(The transfer function of feed-forward control) (6-1)

Under the flux correction mode, the flux correction mode primary switch S2q1 of the second axis and the flux correction mode secondary switch S2q2 of the second axis are turned on, and the normal mode switch S1q of the second axis is open-circuited. The primary flux estimator 164q1 of the second axis is used to generate the second-axis component ($\lambda_{o1q}$) of the primary estimated flux ($\lambda_{o1d}$, $\lambda_{o1q}$) according to the second-axis component ($V_{oq}$) of the load voltage ($V_{od}$, $V_{oq}$) in the two-dimensional synchronous reference frame coordinate system. The second-axis component ($V_{oq}$) of the load voltage ($V_{od}$, $V_{oq}$) in the two-dimensional synchronous reference frame coordinate system is transmitted to the secondary flux estimator 164q2 of the second axis through the flux correction mode primary switch S2q1 of the second axis, and thus the secondary flux estimator 164q2 of the second axis generates the second-axis component ($\lambda_{o2q}$) of the secondary estimated flux ($\lambda_{o2d}$, $\lambda_{o2q}$) according to the second-axis component ($V_{oq}$) of the load voltage ($V_{od}$, $V_{oq}$) in the two-dimensional synchronous reference frame coordinate system. The first operation block 164q6 of the second axis is used to calculate the second-axis component ($d\lambda_{o1q}$) of a primary flux error ($d\lambda_{o1d}$, $d\lambda_{o1q}$) between the second-axis component ($\lambda_{oq}^*$) of the flux command ($\lambda_{od}^*$, $\lambda_{oq}^*$) and the second-axis component ($\lambda_{o1d}$) of the primary estimated flux ($\lambda_{o1d}$, $\lambda_{o1q}$), which means that $d\lambda_{o1q}=\lambda_{oq}^*-\lambda_{o1q}$. The second operation block 164d7 of the second axis is used to calculate the second-axis component ($d\lambda_{o2q}$) of the secondary flux error ($d\lambda_{o2d}$, $d\lambda_{o2q}$) between the second-axis component ($\lambda_{oq}^*$) of the flux command ($\lambda_{od}^*$, $\lambda_{oq}^*$) and the second-axis component ($\lambda_{o2q}$) of the secondary estimated flux ($\lambda_{o2d}$, $\lambda_{o2q}$), which means that $d\lambda_{o2q}=\lambda_{oq}^*-\lambda_{o2q}$. The startup weighing compensation block 164q4 of the second axis and the startup proportional compensation block 164q5 of the second axis employ a first weighing coefficient $K_{d1}$ and a second weighing coefficient $K_{d2}$ to estimate the average quantity of the flux deviation of the second inductive load 2b in the positive half-cycles and in the negative half-cycles, and then employ a startup proportion $K_{px}$ to transform the estimated average quantity of the flux deviation into the second-axis component $V_{x-q}$ of the secondary compensation voltage command ($V_{x-d}$, $V_{x-q}$), which is in turn transmitted to the corresponding voltage-current control block 165q of the second axis. The relation between the second-axis component ($V_{x-q}$) of the secondary compensation voltage command ($V_{x-d}$, $V_{x-q}$) and the weighing coefficients ($K_{d1}$, $K_{d1}$) as well as the startup proportion $K_{px}$ can be represented by the foregoing equation (7-2) and the following equation (7-3):

$$V_{x-q} = \frac{K_{d1} \times d\lambda_{o1q} + K_{d2} \times d\lambda_{o2q}}{2} \times K_{px} \quad (7-3)$$

$$K_{d1} + K_{d2} = 2.0 \quad (7-2)$$

In this embodiment, the voltage-current control block 165q of the second axis includes a first proportional control block 165q1 of the second axis, a second proportional control block 165q2 of the second axis, a third proportional control block 165q3 of the second axis, a third operation block 165q4 of the second axis, a fourth operation block 165q5 of the second axis, a fifth operation block 165q6 of the second axis, and a sixth operation block 165q7 of the second axis. The gain of the first proportional control block 165q1 of the second axis is the first proportion $K_{PV}$. The gain of the second proportional control block 165q2 of the second axis is the second proportion $K_{PI}$. The gain of the third proportional control block 165q3 of the second axis is the third proportion $K_{IV}$.

In operation, the third operation block 165q4 of the second t axis is used to generate a first control error $e_{1q}$ of the second axis by adding the second-axis component ($V_{o-q}^*$) of the voltage command ($V_{o-d}^*$, $V_{o-q}^*$) with the second-axis component ($V_{comp-q}$) of the primary compensation voltage command ($V_{comp-d}$, $V_{comp-q}$) plus the second-axis component ($V_{x-q}$) of the secondary compensation voltage command ($V_{x-d}$, $V_{x-q}$) minus the second-axis component ($V_{oq}$) of the load voltage ($V_{od}$, $V_{oq}$) in the two-dimensional synchronous frame coordinate system, which means that $e_{1q}=V_{o-q}^*+V_{comp-q}+V_{x-q}-V_{oq}$. The first proportional control block 165q1 of the second axis is used to multiply the first control error $e_{1q}$ of the second axis by the first proportion $K_{PV}$ to produce a first adjusting control error $e_{1q-a}$ of the second axis, which is in turn transmitted to the fourth operation block 165q5 of the second axis. The fourth operation block 165q5 of the second axis is used to calculate the sum of the first adjusting control error $e_{1q\text{-}a}$ of the second axis and a first decoupling value ($\omega C_f \times V_{oq}$) of the second axis, and thereby generating a second control error $e_{2q}$ of the second axis ($e_{2q}=K_{PV}\times e_{1d}+\omega C_f \times V_{oq}$). The second proportional control block 165$q$2 of the second axis is used to multiply the second control error $e_{2q}$ of the first axis by the second proportion $K_{PI}$ to produce a second adjusting control error $e_{2q\text{-}a}$ of the second axis ($e_{2q\text{-}a}=K_{PI}\times e_{2q}$), which is in turn transmitted to the sixth operation block 165$q$7 of the second axis. The fifth operation block 165$q$6 of the second axis is used to add the second-axis component ($I_{tq}^*$) of an inductor current command ($I_{td}^*$, $I_{tq}^*$) ($I_{tq}^*=\omega C_f \times V_{o\text{-}q}^*$) with the second-axis component ($I_{od}$) of the load current ($I_{od}$, $I_{oq}$) in the two-dimensional synchronous frame coordinate system minus the second-axis component ($I_{tq}$) of the inductor current ($I_{td}$, $I_{tq}$) in the two-dimensional synchronous frame coordinate system, thereby generating a third control error of the second axis ($e_{3q}=I_{tq}^*+I_{oq}-I_{tq}$). The third proportional control block 165$q$3 of the second axis is used to multiply the third control error $e_{q3}$ of the second axis by the third proportion $K_{IV}$ to produce a third adjusting control error $e_{3q\text{-}a}$ of the second axis ($e_{3q\text{-}a}=K_{IV}\times e_{3q}$), which is in turn transmitted to the sixth operation block 165$q$7 of the second axis. The sixth operation block 165$q$7 of the second axis is used to calculate the sum of the second adjusting control error $e_{2q\text{-}a}$ of the second axis, the third adjusting control error $e_{3q\text{-}a}$ of the second axis, a second decoupling value ($\omega C_f \times I_{tq}$) of the second axis, and the second-axis component ($V_{o\text{-}d}^*$) of the voltage command ($V_{o\text{-}d}^*$, $V_{o\text{-}q}^*$), thereby generating the second-axis component ($V_{mq}$) of the reference voltage command ($V_{md}$, $V_{mq}$), wherein $V_{mq}=e_{2q\text{-}a}+e_{3q\text{-}a}+\omega C_f \lambda I_{tq}+V_{o\text{-}q}^*$.

In this embodiment, the pulse-width modulation and inverter block 163$a$ includes the pulse-width modulation block 163 and the inverter 13 (not shown). The pulse-width modulation block 163 is used to generate the switching control signals $V_{g1}$-$V_{g6}$ according to the first-axis component ($V_{md}$) and the second-axis component of the ($V_{mq}$) of the reference voltage command ($V_{md}$, $V_{mq}$) and outputting the switching control signals $V_{g1}$-$V_{g6}$ to the control end of the inverter 13, so as to drive the inverter 13 to convert the DC voltage $V_b$ into the three-phase modulating voltage $V_{t1}$-$V_{t3}$ based on pulse-width modulation.

Figure 4:
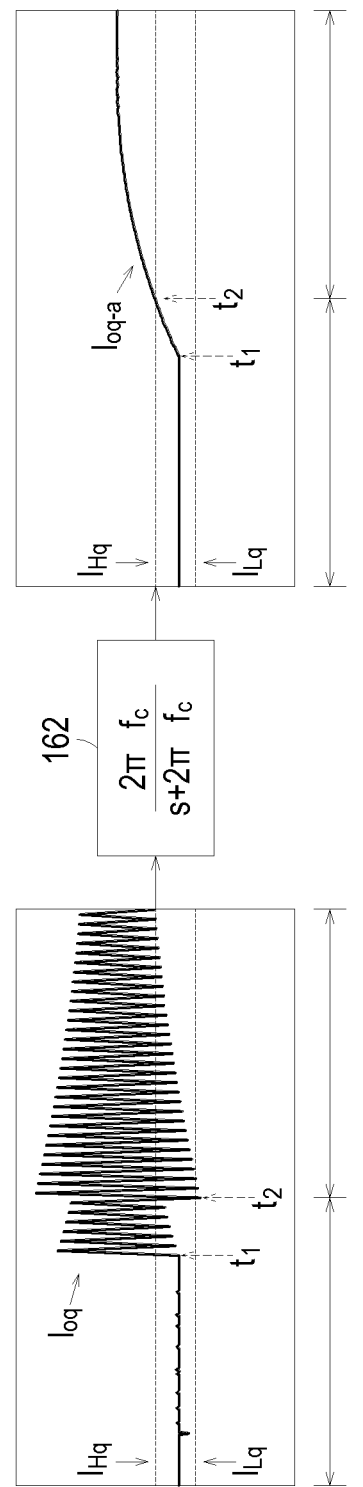
FIG. 4 shows the waveform of the load current and the waveform of the determining signal of the second axis according to the invention.

Referring to FIG. 4 and FIGS. 1-3, in which FIG. 4 shows the waveform of the load current and the waveform of the determining signal $I_{oq\text{-}a}$ of the second axis according to the invention. As shown in FIG. 4, the second-axis component ($I_{oq}$) of the load current ($I_{od}$, $I_{oq}$) in the two-dimensional synchronous frame coordinate system has high-frequency ripples. By removing the ripples of the load current ($I_{od}$, $I_{oq}$) by the low-pass filter 1621, the determining signal $I_{oq\text{-}a}$ of the second axis which has a smoother waveform is obtained. In this embodiment, the second inductive load 2$b$ starts operating at the point $t_1$. In the meantime, the three-phase load current $I_{o1}$-$I_{o3}$, the second-axis component ($I_{oq}$) of the load current ($I_{od}$, $I_{oq}$) in the two-dimensional synchronous frame coordinate system, and the determining signal $I_{oq\text{-}a}$ of the second axis start increasing. The determining signal $I_{oq\text{-}a}$ of the second axis will not be higher than the current upper limit $I_{Hq}$ until the second point $t_2$ is reached. At the point $t_2$, the comparator 1622 drives the flux compensator block 164$d$ of the first axis and the flux compensator block 164$q$ of the second axis to change their operating modes from the normal operating mode to the flux correction mode. The control circuit 16 will adjust the three-phase load voltage $V_{o1}$-$V_{o3}$ to compensate or correct the flux distribution or the flux deviation of the second inductive load 2$b$ in the positive half-cycles and in the negative half-cycles. Therefore, the increasing rate of the second-axis component ($I_{oq}$) of the load current ($I_{od}$, $I_{oq}$) in the two-dimensional synchronous frame coordinate system will be reduced gradually, thereby preventing the faulty comparison made by the comparator 1622 as a result of the high-frequency ripples in the second-axis component ($I_{oq}$) of the load current ($I_{od}$, $I_{oq}$). The time interval between the point $t_1$ and the point $t_2$ can be set to 1.0 ms or less.

Figure 5:
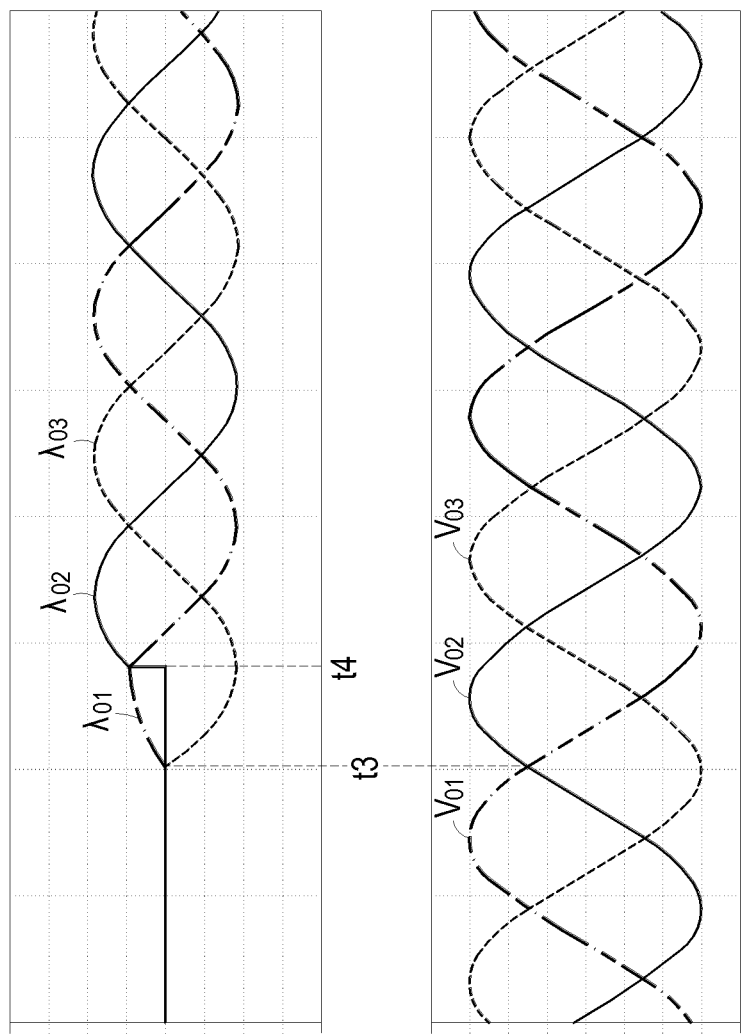
FIG. 5 shows the waveform of the three-phase load voltage and the waveform of the flux of the second inductive load according to the invention.

Referring to FIG. 5 and FIGS. 1-4, in which FIG. 5 shows the waveform of the three-phase load voltage and the waveform of the flux of the second inductive load according to the invention. As shown in FIG. 5, at the point $t_3$, the first-phase voltage $V_{o1}$ of the three-phase load voltage $V_{o1}$-$V_{o3}$ is equal to the second phase voltage $V_{o1}$ of the three-phase load voltage $V_{o1}$-$V_{o3}$ at the point $t_3$, and the control circuit 16 drives the second inductive load 2$b$ to start its first-phase operation and its third-phase operation. In the meantime, the three-phase flux $\lambda_{o1}$-$V_{o3}$ of the second inductive load 2$b$ starts to change with the variation of the three-phase $V_{o1}$-$V_{o3}$. Afterwards, at the point $t_4$, i.e. after the first-phase operation and the third-phase operation of the second inductive load 2$b$ has been started for a quarter cycle, the control circuit 16 drives the second inductive load 2$b$ to start its second-phase operation, thereby completing the flux control procedure of the second inductive load 2$b$ at the startup phase. Hence, the second inductive load 2$b$ can be started by starting the first-phase operation, the second-phase operation, and the third-phase operation of the second inductive load 2$b$ respectively at different time point.

In this embodiment, a three-phase switch (not shown) is placed between the output end of the uninterruptible power supply 1 and the second inductive load 2$b$. The three-phase load voltage $V_{o1}$-$V_{o3}$ of the uninterruptible power supply 1 is transmitted to the second inductive load 2$b$ through the three-phase switch. The control circuit 16 is able to start the first-phase operation, the second-phase operation, and the third-phase operation of the second inductive load 2$b$ respectively at different time point by controlling the ON/OFF timing of each switch in the three-phase switch.

In conclusion, the invention provides an uninterruptible power supply capable of supply power to a plurality of inductive loads and/or capacitive loads which are starting at different time. When the inverter is operating and the three-phase load voltage is supplied by the inverter, the control circuit can employ the flux compensation blocks with different operating mode to adjust the three-phase load voltage so as to sequentially compensate or correct the flux of the inductive loads. Thus inductive loads can be prevented from inducing flux saturation effect when the inductive load is operating at the transient startup phase or when the inductive load is operating at the stable state, thereby preventing the occurrence of the inrush current. Also, the control circuit can drive the inductive load to start its first-phase operation, its second-phase operation, and its third-phase operation respectively at different time point, thereby optimizing the performance of the uninterruptible power supply. Hence, the inventive uninterruptible power supply can subdue the inrush current when the inductive load is started without triggering the over-current protection mechanism of the uninterruptible power supply. Thus, the uninterruptible power supply can continuously supply power to the inductive load. Furthermore, the control circuit is capable of driving the uninterruptible power supply, so that the power semiconductor switch elements and passive elements which have a larger rated power capacity than the inductive load can be eliminated. More advantageously, the external resistance bank which has a high power and high cost can be eliminated so as to save the size and cost of the uninterruptible power supply.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. An uninterruptible power supply for outputting a three-phase load voltage to a first inductive load and a second inductive load, comprising:
   a rectifier for rectifying a three-phase AC voltage into a DC voltage;
   an energy storage unit connected to the rectifier for storing backup power;
   an inverter connected to the energy storage unit for converting the DC voltage into a three-phase modulating voltage according to a switching control signal;
   a filter connected to an output end of the inverter for removing high-frequency components of the three-phase modulating voltage to generate a three-phase inverting voltage;
   a bypass switch circuit connected to the filter, an input end of the rectifier, the first inductive load, and the second inductive load for selectively outputting the three-phase AC voltage or the three-phase inverting voltage as the three-phase load voltage; and
   a control circuit for controlling operations of the uninterruptible power supply and transmitting the three-phase inverting voltage to the first inductive load and the second inductive load through the bypass switch circuit by the bypass switch circuit and the inverter when the three-phase AC voltage is abnormal or interrupted;
   wherein the control circuit is configured to employ a flux compensation block which is set to operate with different operating modes respectively at a startup phase and a stable phase of the second inductive load to adjust the three-phase load voltage for compensating or correcting the flux of the second inductive load, thereby allowing the flux distribution of the second inductive load to be unsaturated.

2. The uninterruptible power supply according to claim 1 wherein when the inverter is operating, the control circuit drives the inverter to operate based on pulse-width modulation and convert the DC voltage into the three-phase modulating voltage based on a space vector pulse-width modulation or a sinusoidal pulse-width modulation.

3. The uninterruptible power supply according to claim 1 wherein when the inverter is operating, the control circuit is configured to generate the switching control signal according to a three-phase inductor current of the filter, the three-phase load voltage, and a three-phase load current, and thereby allowing the inverter to convert the DC voltage into the three-phase modulating voltage.

4. The uninterruptible power supply according to claim 3 wherein the control circuit includes a control block, the control block comprising:
   a coordinate system transformation block for mapping the three-phase inductor current, the three-phase load voltage, and the three-phase load current in the temporal coordinate system respectively into a first axis and a second axis of a two-dimensional synchronous reference frame coordinate system, thereby generating a mapped inductor current, a mapped load voltage, and a mapped load current in the two-dimensional synchronous reference frame coordinate system;
   an inductive load startup detecting block for detecting if the second inductive load is started according to a first-axis component or/and a second-axis component of the mapped load current in the two-dimensional synchronous reference frame coordinate system;
   the flux compensation block for generating a first-axis component and a second-axis component of a primary compensation voltage command and first-axis component and a second-axis component of a secondary compensation voltage command respectively under a normal operating mode and a flux correction mode, thereby compensating the flux of the second inductive load; and
   a voltage-current control block for generating a first-axis component and a second-axis component of a reference voltage command according to the primary compensation voltage command, and secondary compensation voltage command, a voltage command, a first-axis component and a second-axis component of the mapped inductor current in the two-dimensional synchronous reference frame coordinate system, a first-axis component and a second-axis component of the mapped load voltage in the two-dimensional synchronous reference frame coordinate system, or/and the first-axis component and the second-axis component of the mapped load current in the two-dimensional synchronous reference frame coordinate system.

5. The uninterruptible power supply according to claim 4 wherein the inductive load startup detecting block includes a low-pass filter and a comparator, and wherein the low-pass filter is configured to remove high-frequency components of the second-axis component of the mapped load current in the two-dimensional synchronous reference frame coordinate system, and thereby generating a determining signal of the second axis, and wherein the comparator is configured to compare the determining signal of the second axis with a current upper limit or/and a current lower limit and in response thereto changing the operating mode of the flux compensation block.

6. The uninterruptible power supply according to claim 4 wherein the current upper limit and the current lower limit are calculated by a scaling factor and the mapped load current in the two-dimensional synchronous reference frame coordinate system under the normal operating mode.

7. The uninterruptible power supply according to claim 4 wherein when the second inductive load is started and the determining signal of the second axis is higher than the current upper limit or is lower than the current lower limit, the comparator drives the flux compensation block to change its operating mode to a flux correction mode.

8. The uninterruptible power supply according to claim 4 wherein when the second inductive load is started and the determining signal of the second axis is lower than the current upper limit and is higher than the current lower limit, the comparator drives the flux compensation block to change its operating mode to a normal operating mode.

9. The uninterruptible power supply according to claim 4 wherein when the flux compensation block is operating under the flux correction mode, the flux compensation block is configured to stop outputting the first-axis component and the second-axis component of the primary compensation voltage command and outputting the first-axis component and the second-axis component of the secondary compensation voltage command, and wherein the voltage-current control block is configured to generate the first-axis component and the second-axis component of the reference voltage command according to a secondary voltage command and the first-axis component and the second-axis component of the voltage command.

10. The uninterruptible power supply according to claim 4 wherein when the flux compensation block is operating under the normal operating mode, the flux compensation block is configured to stop outputting the first-axis component and the second-axis component of the secondary compensation voltage command and outputting the first-axis component and the second-axis component of the primary compensation voltage command, and wherein the voltage-current control block is configured to generate the first-axis component and the second-axis component of the reference voltage command according to the primary voltage command and the first-axis component and the second-axis component of the voltage command.

11. The uninterruptible power supply according to claim 4 wherein the coordinate system transformation block is configured to employ a stationary reference frame transformation process and a synchronous reference frame transformation process to map the three-phase inductor current, the three-phase load voltage, and the three-phase load current respectively to the first-axis and the second-axis of the two-dimensional synchronous reference frame coordinate system, thereby generating the mapped inductor current, the mapped load voltage, and the mapped load current in the two-dimensional synchronous reference frame coordinate system.

12. The uninterruptible power supply according to claim 4 wherein the flux compensation block includes a flux compensator block of the first axis and a flux compensator block of the second axis, and wherein the voltage-current control block includes a voltage-current control block of the first axis and a voltage-current control block of the second axis.

13. The uninterruptible power supply according to claim 12 wherein the flux compensator block of the first axis includes a primary flux estimator of the first axis, a secondary flux estimator of the second axis, a proportional-integral and feed-forward control block of the first axis, a startup weighing compensation block of the first axis, a startup proportional compensation block of the first axis, a first operation block of the first axis, a second operation block of the first axis, a flux correction mode primary switch of the first axis, a flux correction mode secondary switch of the first axis, and a normal mode switch of the first axis, and wherein:
under the normal operating mode, the flux correction mode primary switch of the first axis and the flux correction mode secondary switch of the first axis are open-circuited, and the normal mode switch of the first axis is turned on, and the primary flux estimator of the first axis is configured to generate the first-axis component of a primary estimated flux according to the first-axis component of the load voltage in the two-dimensional synchronous reference frame coordinate system, and the first operation block of the first axis is configured to calculate the first-axis component of a primary flux error between the first-axis component of a flux command and the first-axis component of the primary estimated flux, and the proportional-integral and feed-forward control block of the first axis is configured to generate the first-axis component of the primary compensation voltage command according to the first-axis component of the primary flux error, and the first-axis component of the primary compensation voltage command is transmitted to the voltage-current control block of the first-axis through the normal mode switch of the first axis.

14. The uninterruptible power supply according to claim 13 wherein:
under the flux correction mode, the flux correction mode primary switch of the first axis and the flux correction mode secondary switch of the first axis are turned on, and the normal mode switch of the first axis is open-circuited, and the primary flux estimator of the first axis is configured to generate the first-axis component of the primary estimated flux according to the first-axis component of the load voltage in the two-dimensional synchronous reference frame coordinate system, and the first-axis component of the load voltage in the two-dimensional synchronous reference frame coordinate system is transmitted to the secondary flux estimator of the first axis through the flux correction mode primary switch of the first axis, and the secondary flux estimator of the first axis is configured to generate the first-axis component of a secondary estimated flux according to the first-axis component of the load voltage in the two-dimensional synchronous reference frame coordinate system, and wherein the first operation block of the first axis is configured to calculate the first-axis component of a primary flux error between the first-axis component of the flux command and the first-axis component of the primary estimated flux, and the second operation block of the first axis is configured to calculate the first-axis component of a secondary flux error between the first-axis component of the flux command and the first-axis component of the secondary estimated flux, and wherein the startup weighing compensation block of the first axis and the startup proportional compensation block of the first axis employ a first weighing coefficient and a second weighing coefficient to estimate the average quantity of a flux deviation of the second inductive load in the positive half-cycles and in the negative half-cycles, and employ a startup proportion to transform the estimated average quantity of the flux deviation into the first-axis component of the secondary compensation voltage command, wherein the secondary compensation voltage command is transmitted to the corresponding voltage-current control block of the first axis.

15. The uninterruptible power supply according to claim 14 wherein the sum of the first weighing coefficient and the second weighing coefficient is substantially equal to two.

16. The uninterruptible power supply according to claim 15 wherein the voltage-current control block of the first axis includes a first proportional control block of the first axis, a second proportional control block of the first axis, a third proportional control block of the first axis, a third operation block of the first axis, a fourth operation block of the first axis, a fifth operation block of the first axis, and a sixth operation block of the first axis, and wherein the gain of the first proportional control block of the first axis is a first proportion, the gain of the second proportional control block of the first axis is a second proportion, and the gain of the third proportional control block of the first axis is a third proportion, and wherein:
in operation, the third operation block of the first axis is configured to generate a first control error of the first axis by adding the first-axis component of the voltage command with the first-axis component of the primary compensation voltage command plus the first-axis component of the secondary compensation voltage command minus the first-axis component of the load voltage in the two-dimensional synchronous frame coordinate system, and wherein the first proportional control block of the first axis is configured to multiply the first control error of the first axis by the first proportion to produce a first adjusting control error of the first axis, wherein the first adjusting control error of the first axis is transmitted to the fourth operation block of the first axis, and wherein the fourth operation block of the first axis is used to calculate the difference between the first adjusting control error of the first axis and a first decoupling value of the first axis, and thereby generating a second control error of the first axis, and wherein the second proportional control block of the first axis is configured to multiply the second control error of the first axis by the second proportion to produce a second adjusting control error of the first axis, wherein the second adjusting control error of the first axis is transmitted to the sixth operation block of the first axis, and wherein the fifth operation block of the first axis is configured to add the first-axis component of an inductor current command with the first-axis component of the load current in the two-dimensional synchronous frame coordinate system minus the first-axis component of the mapped inductor current in the two-dimensional synchronous frame coordinate system, thereby generating a third control error of the first axis, and wherein the third proportional control block of the first axis is configured to multiply the third control error of the first axis by the third proportion to produce a third adjusting control error of the first axis, wherein the third adjusting control error of the first axis is transmitted to the sixth operation block of the first axis, and wherein the sixth operation block of the first axis is configured to calculate the difference among the second adjusting control error of the first axis, the third adjusting control error of the first axis, a second decoupling value of the first axis, and the first-axis component of the voltage command, thereby generating the first-axis component of the reference voltage command.

17. The uninterruptible power supply according to claim 1 wherein the control circuit is a digital signal processor.

18. The uninterruptible power supply according to claim 1 wherein the uninterruptible power supply is an off-line uninterruptible power supply, a line-interactive uninterruptible power supply, or an on-line uninterruptible power supply.

19. The uninterruptible power supply according to claim 1 wherein the inverter includes a first switch pair, a second switch pair, and a third switch pair, each of which is connected in parallel with each other and connected to the energy storage unit, and wherein the first switch pair, the second switch pair, and the third switch pair are configured to turn on or off in response to the switching control signal generated by the control circuit, thereby allowing the DC voltage to be transmitted to the filter through the first switch pair, the second switch pair, or/and the third switch pair.

20. The uninterruptible power supply according to claim 1 wherein the bypass switch circuit includes a first switch circuit connected between a first input end of the bypass switch circuit and an output end of the bypass switch circuit, and a second switch circuit connected between a second input end of the bypass switch circuit and an output end of the bypass switch circuit.

\* \* \* \* \*